Patented Oct. 30, 1951

2,572,951

UNITED STATES PATENT OFFICE 2,572,951

STYRENE COPOLYMER COMPOSITIONS

Milton John Roedel, Wilmington, Del., assignor to E. I. du Pont de Nemours & Company, Wilmington, Del., a corporation of Delaware No Drawing. Application July 3, 1948, Serial No. 37,079

11 Claims. (Cl. 260—86.7)

This invention relates to new compositions of matter and particularly to polymeric materials.

Styrene is a readily available, low-cost raw material and is polymerizable to an inert polymer. It has not found extensive use in finishes because of the extreme brittleness, poor adhesion and crazing tendencies of applied coatings and because of the low solids of solutions and the tendency to cobweb when sprayed. Much effort has been expended to overcome the disadvantages of polystyrene by addition of plasticizers or by addition of comonomer components or drying oils prior to polymerization. In general, these efforts have met with little success since when the flexibility is improved, the coating is too thermoplastic or too soft for utility and is no longer inert to acids, alkalies, grease or soap solutions.

This invention has as an object the preparation of a new styrene copolymer. A further object is the preparation of improved styrene polymer coating compositions. Other objects will appear hereinafter.

These objects are accomplished by the invention of copolymers containing 40–70 per cent, by weight, of styrene, the remainder of the copolymer being beta-allyoxyethyl acrylate, and of coating compositons comprising said polymers. These copolymers yield solutions in aromatic hydrocarbon solvents of high solid content which do not cobweb when applied from a spray gun. After curing, the coatings obtained are flexible, possess excellent adhesion and do not craze. These cured coatings also possess high inertness to solvents, print resistance at elevated temperatures, blush resistance on processing in contact with hot foodstuffs, heat stability at soldering temperatures, grease, acid and alkali resistance, excellent outdoor durability and other desirable properties which will be disclosed hereinafter.

In practicing this invention, any suitable method may be used for conducting the copolymerization of the monomeric compounds such as the use of heat and/or light and free radical producing catalysts, e. g., oxygen and peroxides, including acyl peroxides, alkyl peroxides, alkyl percarboxylates, alkyl hydroperoxides, azines, aliphatic azo compounds, persulfates, perborates, hydrogen peroxide and like materials commonly used to initiate addition polymerizations. Polymerization can be carried out batch-wise, semicontinuously or continuously in solution systems using an organic solvent such as benzene, toluene, xylene, cyclohexane, cyclohexanone or high boiling petroleum fractions. In general the polymerization is conducted at temperatures of from about 20° C. to about 200° C. After the desired degree of polymerization has occurred, the resulting polymer can be isolated by conventional methods, or the polymer used as formed in solution.

Copolymerizations carried out with varying styrene/beta-allyloxyethyl acrylate monomer ratios have demonstrated that 10 per cent of beta-allyloxyethyl acrylate is sufficient to yield a curable styrene polymer but that 30 per cent is required to obtain coatings of sufficient flexibility to be of practical use. In the range of 70 to 40 per cent styrene content the flexibility is good.

These polymers are cured, or insolubilized, after several hours at room temperatures in the presence of conventional driers such as cobalt naphthenate or in a matter of minutes by baking at temperatures from 100° C. to 225° C. or higher.

The cured products are difficulty fusible, insoluble in solvents for the unconverted polymers and possess an unusual combination of valuable properties which are referred to in more detail later.

The following examples in which parts are by weight are illustrative of the invention.

EXAMPLE Ia

*Preparation of beta-allyloxyethyl acrylate*

Beta-allyloxyethanol was prepared by reacting ethylene oxide with allyl alcohol containing 2 per cent potassium hydroxide as catalyst at reflux temperature. The potassium hydroxide was then neutralized with carbon dioxide, the solids removed by filtration, and the excess allyl alcohol distilled off. The beta-allyloxyethanol was then collected at 80–83° C. at 50 mm. Hg pressure ($n_D^{25}=1.4324$). The beta-allyloxyethyl acrylate was then prepared by ester interchange between beta-allyloxyethanol and excess ethyl acrylate using paratoluenesulfonic acid monohydrate as catalyst and hydroquinone as inhibitor and fractionating off the ethanol as formed. The excess ethyl acrylate was then distilled off and the beta-allyloxyethyl acrylate

collected at 72° C. at 7 mm. Hg pressure ($n_D^{25}=1.4423$, saponification number=359;358). This monomer is readily polymerizable and is stored under nitrogen at about 0° C. until ready for use or stabilized with inhibitors such as hydroquinone.

EXAMPLE Ib

Preparation of 40/60 allyloxyethyl acrylate/styrene copolymer

A reactor was swept out with nitrogen and charged with 300 parts of styrene, 200 parts of beta-allyloxyethyl acrylate, 500 parts of xylene, 1000 parts of benzene and 10 parts of alpha,alpha'-azobis(isobutyronitrile) as catalyst. The charge was then heated to 60° C. After fifty hours the solution solids had reached 22.5 per cent indicating a conversion of 90 per cent. The viscosity of the solution at this point was 0.005 poise at 25° C. The charge was then cooled down to room temperature, 0.10 part of hydroquinone added and the benzene distilled from the solution under reduced pressure until a 52 per cent solids solution remained which possessed a viscosity of 3.4 poise.

EXAMPLE Ic

Use of copolymer of Example Ib in coating

The final solution of Example Ib was applied to Bonderized (phosphate-treated rust-resistant) autobody steel panels and baked 30 minutes at 190° C. to give a coating approximately 1 mil thick. The coating was clear, colorless, glossy, hard and mar resistant. The adhesion was excellent, no crazing was apparent and the panel could be bent on a conical mandrel without failure of the continuity of the coating. The coating was no longer soluble in or even swollen by xylene. When sand was placed on the coating under a one lb./in² weight and heated 30 minutes at 90° C. no printing occurred, demonstrating that this coating was very print resistant. When the coated panel was placed outdoors on an exposure rack (45° South, Wilmington, Delaware), no underfilm rusting, loss of gloss crazing, peeling or other failure occurred within a four-month period. Similar results were obtained with enamels made by ball-milling 50 to 100 parts of titanium dioxide with 100 parts of copolymer in the form of the concentrated reactor solution. Enamels did not exhibit cobwebbing when sprayed. Baked enamel coatings as well as clears were inert to 1% sodium hydroxide solution, 10% sulfuric acid, a 50/50 mixture of oleic acid and cottonseed oil and were unaffected by immersion for two weeks in a 2% soap solution at 75° C. Under these conditions most conventional commercial finishes show marked blistering, softening or erosion.

When the above styrene copolymer was applied to tin plate or black metal plate at coating weights of from about 15 to about 25 milligrams per four square inches and baked 10 minutes at 210° C. a clear, colorless, adherent, inert, flexible coating was obtained. Can lids stamped out of the sheet metal and processed 2 hours at 15 lb. steam pressure in the presence of foodstuffs, including pumpkin mash, string beans, asparagus, sardines, corn and tomato juice showed no blushing or staining and the coating remained adherent. When the back side of the coated sheet metal was momentarily placed on molten solder at 750° F. no noticeable discoloration occurred whereas conventional can coatings darkened considerably and lost their film integrity. Poor heat stability on soldering of the can container side seam is a serious deficiency of orthodox can coatings.

EXAMPLE II

Preparation of 30/70 allyloxyethyl acrylate/styrene copolymer

A solution consisting of 7 parts of styrene, 3 parts of beta-allyloxyethyl acrylate, 10 parts of xylene and 0.1 part of alpha,alpha'-azobis(isobutyronitrile) was heated at 60° C. for 15.5 hours. At the end of this period the solution viscosity was 1.8 poise at 25° C. and the solids content of the solution was 35.0 per cent. The following table lists in tabular form the coating properties obtained on applying this polymer solution to Bonderized (phosphate-treated rust-resistant) autobody steel panels and treating as indicated.

| Added Agents | Time and Temperature of Bake | Solubility in Xylene | Print Resistance at 93° C. |
| --- | --- | --- | --- |
| None | ½ hr. at 120° C | Soluble | Heavy print. |
| Do | ½ hr. at 150° C | Insoluble | No print. |
| Cobalt Naphthenate | ½ hr. at 120° C | do | Do. |
| None | 4 days at 25° C | Soluble | Heavy print. |
| Cobalt Naphthenate | 4 days at 25° C | Insoluble | Very slight print. |

The above data demonstrate that the soluble copolymer prepared by polymerizing styrene and beta-allyloxyethyl acrylate can be cured readily by baking or by air-drying in the presence of metallic driers. In addition to cobalt naphthenate, other metallic driers that can be used either alone or in admixtures include the organic solvent soluble salts of manganese, lead, iron, vanadium, calcium, zinc, etc.

EXAMPLE III

Allyloxyethyl acrylate/styrene copolymers

The following table lists the data obtained in polymerizing 0, 10, 20, 30 and 40 per cent by weight of beta-allyloxyethyl acrylate with 100, 90, 80, 70 and 60 per cent by weight respectively of styrene. The charge consisted of 10 parts of mixed monomers, 10 parts of xylene and 0.1 part of alpha,alpha'-azobis(isobutyronitrile):

| Per Cent Styrene | Per Cent Beta-Allyloxyethyl Acrylate | Polymerization Temperature and Time | Solids Content of Solution | Properties of Coatings baked 30 min. at 177° C. | |
| --- | --- | --- | --- | --- | --- |
| | | | | Flexibility | Xylene Solubility |
| | | | Per Cent | | |
| 100 | 0 | 60° C., 10.5 hr | 22 | Very poor | Soluble. |
| 90 | 10 | do | 25 | Poor | Insoluble. |
| 80 | 20 | do | 25 | Fair | Do. |
| 70 | 30 | do | 25 | Good | Do. |
| 60 | 40 | do | 29 | Excellent | Do. |

The preceding data demonstrate that 10 per cent by weight beta-allyloxyethyl acrylate is sufficient to produce a curable styrene polymer and that 30 per cent by weight of beta-allyloxyethyl acrylate is required in order to obtain good flexibility.

EXAMPLE IV

*Preparation of 60/40 allyloxyethyl acrylate/styrene copolymer*

The following charge was heated at 60° C. for 53 hours: 40 parts of styrene, 60 parts of allyloxyethyl acrylate, 100 parts of benzene, 300 parts of xylene and 3 parts of alpha,alpha'-azobis(isobutyronitrile). A clear, colorless solution was obtained possessing a viscosity of 0.005 poise and a solids content of 18.8 per cent by weight indicating a conversion of monomer to polymer of 94.0 per cent. Then 0.2 part of quinone was added as a stabilizer and the benzene removed by vacuum distillation. A clear, viscous solution was obtained possessing a solids content of 47 per cent and a viscosity of 1.65 poise. A white enamel was prepared by ball milling 43.5 parts of this solution with 15 parts of titanium dioxide and 11.5 parts of xylene. This procedure produced a 50 per cent solids enamel at spray viscosity. Coatings applied to Bonderized steel panels and baked 30 minutes at 177° C. possessed excellent color, excellent gloss, high hardness, excellent mandrel flexibility in the Standard ASTM Conical Mandrel Test (ASTM Bulletin, December 1937), excellent adhesion, good mar resistance, excellent solvent resistance and showed no print at 93° C. indicating the utility of this copolymer as the vehicle for finishes.

EXAMPLE V

*Preparation of 60/40 allyloxyethyl acrylate/styrene copolymer*

A reactor was charged with 15 parts of styrene, 10 parts of beta-allyloxyethyl acrylate, 100 parts of xylene and 0.5 part of benzoyl peroxide and swept with nitrogen. After this solution had been heated 21 hours at 75° C. the solids content was 16.0 per cent by weight indicating that a conversion of monomer to polymer of 80 per cent had been obtained. Then 2.5 parts of a mixture of terpenes containing dipentene and terpinolene was added as a stabilizer and the solution concentrated by vacuum distillation. A clear, colorless, viscous solution was obtained containing 47 per cent solids and having a viscosity of 1.83 poise. This solution was applied to a Bonderized steel panel and baked 30 minutes at 190° C. at a coating thickness of 1-2 mils. The coating obtained possessed excellent color, hardness, flexibility and adhesion, and was not soluble in xylene demonstrating that it had been insolubilized under the baking condition.

EXAMPLE VI

*Preparation of 60/40 allyloxyethyl acrylate/styrene copolymer*

A reactor having a condenser, stirrer and inlet tube was charged with 60 parts of styrene, 40 parts of beta-allyloxyethyl acrylate, 100 parts of tetrahydronaphthalene and 200 parts of xylene and heated to 135° C. with vigorous agitation. Air was passed through the inlet tube beneath the solution for a period of 10 hours. The solution was then cooled to room temperature. The solids content of the solution was 21.8, by weight, indicating a conversion of 87%. The solution viscosity was 0.05 poise at 25° C. A total of 10 parts of the terpene mixture described in Example V was added and the solution concentrated to 40% solids by vacuum distillation. There was obtained a clear, colorless solution having a viscosity of 1.25 poise. When this solution was applied to a metal surface and baked for 30 minutes at 175-210° C., a clear, colorless, glossy, hard, flexible, insoluble, print-resistant, inert coating was obtained.

The polymerization is preferably carried out by reacting the monomers at 20-200° C. in the presence of 0.01 to 5% of a free radical type polymerization catalyst until conversions of 50 per cent or higher are obtained. A comparison of coating properties with the per cent conversion of monomers to copolymer for conversions varying from 50-98% has shown that throughout this range comparable properties are obtained. This indicates that styrene and beta-allyloxyethyl acrylate copolymerize at approximately the concentration introduced. The copolymerization may be carried to very high conversions without adversely affecting copolymer properties.

Particularly useful catalysts are the aliphatic azo compounds of Hunt application Serial No. 2551, filed January 15, 1948, now Patent No. 2,471,959 issued May 31, 1949. These include azo compounds having the azo nitrogens each attached to tertiary carbon which carbon is bonded to carbon of a radical neutral with respect to acidity in which radical the remaining valences of said radical carbon are satisfied by elements of integral atomic number of 7 to 8, i. e., oxygen and nitrogen. Examples of such azo catalysts are azobis(isobutyronitrile), alpha,alpha' - azobis(alpha,gamma - dimethylvaleronitrile), alpha,alpha' - azobis(alpha - methyl-gamma-methoxyvaleronitrile), and 1,1'-azobis-(cyclohexanecarbonitrile). The azo catalysts may be prepared by the methods disclosed in Alderson and Robertson Serial No. 736,586, filed March 22, 1947 now Patent No. 2,469,358 issued May 10, 1949.

Polymerization modifiers, accelerators, surface-active agents, etc., such as mercaptans, isopropyl alcohol, xanthates, maleic anhydride, which are commonly used as adjuvants in addition polymerizations may also be used in the preparation of the copolymers of this invention.

When solvents such as benzene, toluene, xylene, tetralin, cyclohexane, cyclohexanone and petroleum fractions of similar volatility are employed, they are generally present in amounts of 50% to 80% of the total charge. Preferably they are present in amounts of 75-80% to obtain substantially quantitative conversions without gelation.

Under similar conditions of polymerization, styrene alone yields a polymer which cobwebs when sprayed and which after baking is very brittle, crazed, soluble in xylene, and possesses poor adhesion. Styrene copolymers containing 10 to 20 per cent beta-allyloxyethyl acrylate as the copolymer component are likewise too brittle to be of practical interest although these copolymers insolubilize on baking. Styrene copolymers containing above 60 per cent beta-allyloxyethyl acrylate show inferior properties particularly in heat resistance and inertness. There is also difficulty due to gelation at low conversions to insoluble, brittle polymers. Beta-allyloxyethyl methacrylate copolymers with styrene are inferior in the important properties of flexibility and adhesion to the corresponding beta-allyloxyethyl acrylate copolymers. Plasticizers, pigments, dyes, reinforcing agents, peroxides, other film-formers, waxes, driers, resins, antioxidants, inhibitors, vulcanizing agents and like materials commonly used in formulating polymeric compositions can be used in conjunction with the polymeric materials of this invention.

In view of the combination of valuable properties possessed by the styrene polymers described herein, they are eminently suitable for a wide variety of outlets where flexibility, inertness, hardness and insolubility is desired, such as decorative, industrial and maintenance finishes; e. g., for wood, glass, paper, leather, aluminum, magnesium, steel, iron, zinc, tin, plastics and formed articles, such as refrigerators, cold lockers, sink cabinets, washing machines, automobiles, coatings for metal containers for beer, milk, foodstuffs, paints, oil, etc., food processing equipment, electroplating bath racks, laminating resins, adhesives, coated fabrics, particularly glass fabrics, unsupported sheeting, safety glass interlayer, cable and wire coatings, artificial tile and floor coverings, tubing, molded plastic articles and like outlets. In general, the thickness of coating of the copolymer on a surface is preferably 0.1 to 4.0 mils.

The foregoing detailed description has been given for clearness of understanding only and no unnecessary limitations are to be understood therefrom. The invention is not limted to the exact details shown and described for obvious modifications will occur to those skilled in the art.

What is claimed is:

1. A coating composition comprising in solution in a volatile organic solvent therefor a copolymer which contains 40–70% styrene, the rest being beta-allyloxyethyl acrylate.

2. The coating composition of claim 1 containing a pigment.

3. The coating composition of claim 1 containing a metallic drier.

4. The coating composition of claim 3 wherein the drier is a cobalt drier.

5. An article coated with a copolymer containing 40–70% styrene units, the rest being beta-allyloxyethyl acrylate units, the coating being insoluble in aromatic organic solvents.

6. A rigid article coated with a copolymer containing 40–70% styrene units, the rest being beta-allyloxyethyl acrylate units, the coating being insoluble in aromatic organic solvents.

7. A metal article coated with a copolymer containing 40–70% styrene units, the rest being beta-allyloxyethyl acrylate units, the coating being insoluble in aromatic organic solvents.

8. A metallic container coated with a copolymer containing 40–70% styrene units, the rest being beta-allyloxyethyl acrylate units, the coating being insoluble in aromatic organic solvents.

9. Process for the preparation of soluble, flexible, inert copolymers which comprises subjecting to polymerizing conditions, in solution in an inert organic solvent, a mixture, the polymerizable components of which comprise 40–70% styrene and 60–30% beta-allyloxyethyl acrylate until at least 50% of the monomer composition is polymerized and stopping the polymerization prior to gelation.

10. Process of claim 9 wherein the monomers are polymerized in an inert volatile organic solvent with the aid of a free radical producing polymerization catalyst.

11. Process of claim 10 wherein the catalyst is an azo compound wherein each of the azo nitrogens is bonded to tertiary carbon which is bonded to carbon of a radical neutral with respect to acidity in which radical each of the remaining valences of said radical carbon is bonded to an element of integral atomic number of 7 to 8.

MILTON JOHN ROEDEL.

REFERENCES CITED

The following references are of record in the file of this patent:

UNITED STATES PATENTS

| Number | Name | Date |
| --- | --- | --- |
| 2,370,562 | Meunier | Feb. 27, 1945 |
| 2,370,578 | Pollack et al. | Feb. 27, 1945 |
| 2,444,655 | Kroeker et al. | July 6, 1948 |
| 2,449,489 | Larson | Sept. 14, 1948 |
| 2,471,959 | Hunt | May 31, 1949 |